(No Model.) 2 Sheets—Sheet 2.

E. E. HATFIELD.
CULTIVATOR.

No. 471,218. Patented Mar. 22, 1892.

Witnesses:

Inventor,
Emerson E. Hatfield,

By his Attorneys,

UNITED STATES PATENT OFFICE.

EMERSON E. HATFIELD, OF BETHANY, MISSOURI.

CULTIVATOR.

SPECIFICATION forming part of Letters Patent No. 471,218, dated March 22, 1892.

Application filed September 1, 1891. Serial No. 404,433. (No model.)

*To all whom it may concern:*

Be it known that I, EMERSON E. HATFIELD, a citizen of the United States, residing at Bethany, in the county of Harrison and State of Missouri, have invented a new and useful Cultivator, of which the following is a specification.

This invention relates to cultivators; and it has for its object to provide a device of the class of cultivators that are especially used for cultivating listed corn, and to provide a cultivator which will thoroughly cultivate the corn without interfering with the roots thereof and thereby impeding its growth, being especially designed to remove the weeds from the corn to the middle of the ridge and there covering the same up, while at the same time it can be used any time after the corn is planted, thus affording the earliest possible culture.

With these and other objects in view the invention consists of a cultivator having double sweeps arranged, constructed, and operated in the novel manner hereinafter more fully described, illustrated, and claimed.

Figure 1:
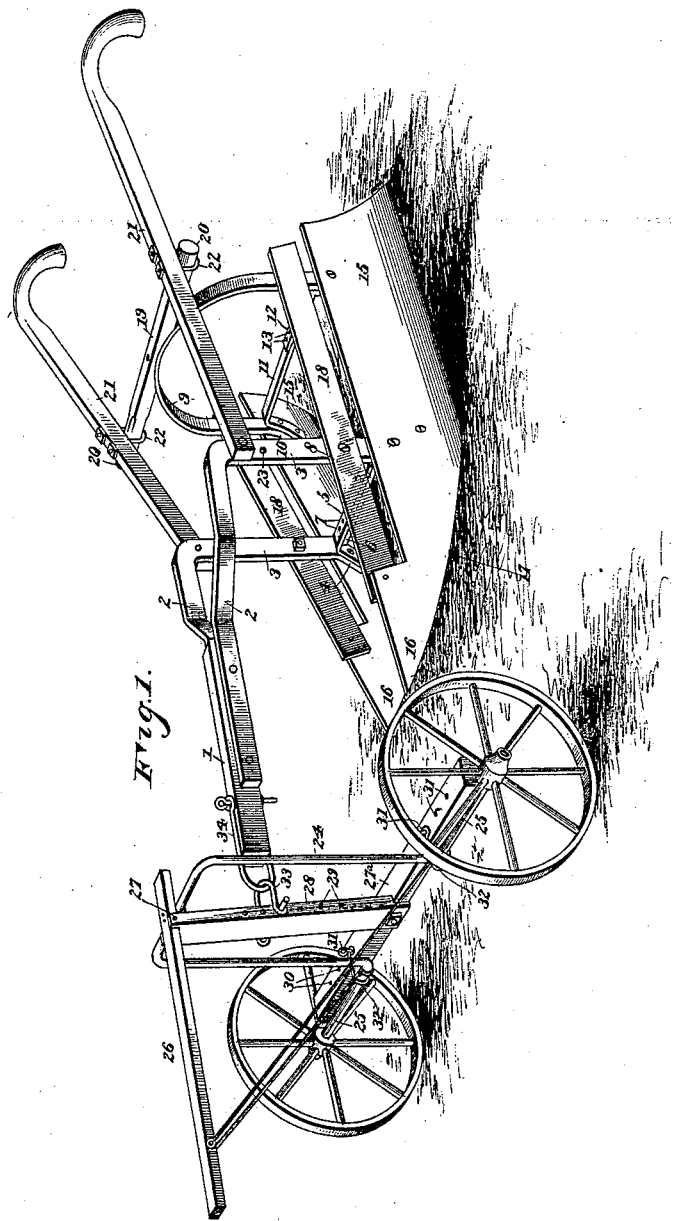
Figure 2:
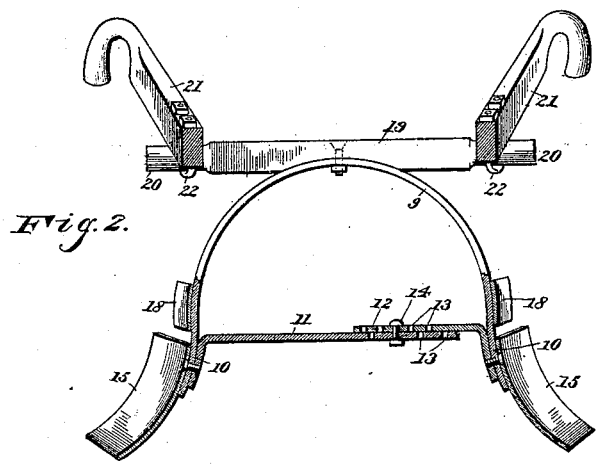
Figure 3:
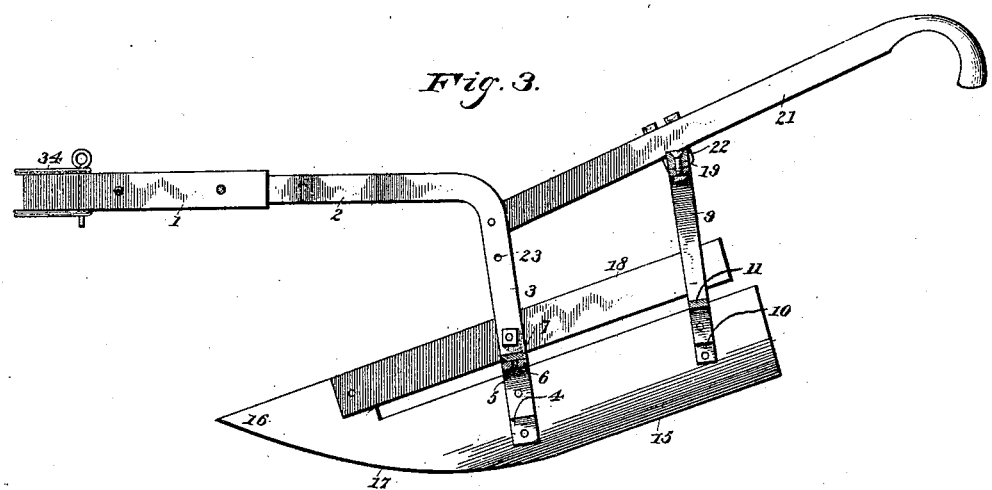

In the accompanying drawings, Figure 1 is a perspective view of a cultivator constructed in accordance with my invention. Fig. 2 is a transverse sectional view of the same, looking rearwardly. Fig. 3 is a longitudinal sectional view, the draft device being removed from the cultivator.

Referring to the accompanying drawings, 1 represents the main central beam or bar, to either side of which are securely bolted the rearwardly extending and diverging spring-beams 2, each of which is provided with a vertical spring shank or standard portion 3, terminating at their lower outer ends in the outwardly-inclined or angle portions 4. Bolted to the inner side of the opposite angle portion of said beam are the brace-rod sections 5 and 6, each of which is provided with a series of perforations or holes 7, which are designed to be adjustably engaged by the bolts 8, by means of which the space between the two ends of the rearwardly-extending spring cultivator-beams may be regulated according to the width of the furrow to be cut. A short distance to the rear of the downwardly-extending standard portions 3 of the cultivator-beam is the spacing and securing inverted-U-shaped spring-arch bar 9, the lower outer ends of which are bent downward and are also provided with the inclined or angled portions 10, corresponding to the inclined or angled portions at the lower end of the cultivator-beams, said angled ends of the arch-bar being spaced normally wider apart than the two beams just described. Brace-bars 11 and 12 are also secured to the inner sides of the opposite ends of said arch-bar, and are provided with a series of perforations or holes 13, that are designed to be adjustably engaged by the screw-bolts 14, by means of which the space between the two ends of the arch-bar, the tendency of which is to spread, may be regulated to suit the space between the ends of the beams and preserve the proper angle between the respective ends of the arch-bar and said beams.

Securely bolted to the inclined ends of the beams 2 and the arch-bar 9 are the elongated sweeps or shares 15, which, on account of the inclined or outward pitch of said inclined ends, are thrown outwardly and grasp the earth to be turned more easily and readily. The said shares, on account of the difference in width between the ends of the beams and the arch-bars, naturally diverge rearwardly from each other, and thus throw the dirt to either side of the furrow which is cut. The front ends of said sweeps 15 are regulated the requisite distance apart from each other by bolts of the laterally-adjustable brace-bars 5 and 6, while the rear ends thereof may be similarly adjusted by means of the rear laterally-adjustable brace-bars, the points 16 extending above the top edges of the main portion of the rearwardly-extending sweeps, and are formed to a cutting-point by the beveled edges 17 of the sweep, which extends from the front portion of the sweep rearwardly to the outer or bottom edges of the same, and when the cultivator is in operation said beveled edges are designed to travel upon the surface of the ground, thus elevating the rear or back portion of the shares to more effectually serve in the capacity of a mold-board to turn over the earth. Parallel clod fenders or guards 18 are bolted to the points of the sweeps and are secured to the sides of the opposite beams and the rear arch-bar parallel with the top edges of the sweeps, and thus throw back the clods which are turned over above the top edges of said sweeps. A cross-bar 19 is securely bolted to the top of the rear arch-bar 9 and extending horizontally out on either side terminates in the rounded ends 20. The rearwardly-extending handles 21 are laterally adjustable and supported upon said supporting or cross bar 19 by means of the clip-bolts 22, engaging over the rounded ends of said bar, while the plow-handles are rendered vertically adjustable by means of the front ends thereof adjustably engaging any one of the series of perforations or holes 23, located in the standard portions 3 of the said beams.

24 represents an ordinary arch-frame used with ordinary cultivators, and terminates in the outwardly-extending axle or spindle arms 25, to which the ordinary wheels are secured, and is provided with the usual braced tongue 26, secured thereto in the usual manner. Pivotally secured at 27 to the rear end of said tongue is the vertical draft-bar 28, provided with a series of transverse perforations 29, and which is secured at its lower end to the right-angularly-disposed securing-bar 27ª, provided with a series of vertical perforations or holes 30, which are designed to be engaged by the pins 31, holding the engaging loops or clips 32, which are designed to take over the axles or spindle portion of the arched frame, and by means of the adjustment afforded by said vertical perforations may be secured to any cultivator-frame. A loop 33, vertically adjustable in the transverse perforations 29 in said vertical pivoted bar, is designed to engage the clevis 34, pivotally secured to the front main beam 1 of the cultivator attachment, and by means of which the said cultivator may be elevated at any desired height, according to the depth of cut desired to be made.

The construction and operation of the herein-described cultivator is thought to be apparent without further description.

Having thus described my invention, what I claim, and desire to secure by Letters Patent, is—

1. In a cultivator, rearwardly extending and diverging spring-beams provided with lower inclined ends, elongated sweeps secured upon said inclined ends and extending rearwardly and outwardly at a corresponding angle therefrom, clod fenders or guards secured to the front ends or points of said sweeps and parallel with the top edges of the same, and means for laterally adjusting said spring-beams, substantially as set forth.

2. In a cultivator, rearwardly extending and diverging spring-beams provided with lower outwardly-inclined ends, a rear spring arch-bar having similarly-inclined lower ends, elongated sweeps secured to the inclined or angle ends of the beams and the arch-bar on opposite sides thereof, the said sweeps being provided with enlarged pointed ends adjacent to each other and inclined edges extending from the points to the bottom edges of the rear portions of the same, clod fenders or guards secured to the points of the sweeps and the sides of the beams and arch-bar parallel with the top edges of said sweeps, and means for laterally adjusting said sweeps, substantially as set forth.

3. In a cultivator, the combination of the rearwardly-extending spring-beams, the spring arch-bar located to the rear of said beams, opposite diverging sweeps secured at an angle to the lower ends of said beams and arch-bar, and overlapping brace-bars secured to opposite sides or ends of the spring-beams and arch-bar and provided with a series of perforations or holes adapted to be adjustably engaged by adjusting screws or bolts, substantially as set forth.

4. In a cultivator, rearwardly-extending beams provided with a series of perforations in the depending portions thereof, an arch-bar located in the rear of said beams, sweeps diverging from their adjacent points and secured at an angle to the lower ends of said beams and arch-bar, a transverse supporting-bar secured horizontally upon said arch-bar and provided with extended rounded ends, and the rearwardly-extending handles vertically adjustable in the perforations in said beams and laterally adjustable upon the rounded ends of said supporting-bar, substantially as set forth.

5. In a cultivator, the combination, with a cultivator-beam and wheel-supported arch and draft-tongue, of the vertical draft-bar pivotally and detachably secured at its upper end to said tongue and depending within the arch therefrom, the horizontal retaining-bar rigidly secured to the free lower end of said draft-bar and provided with a series of perforations near each opposite end, the laterally-adjustable loops loosely engaging over the axles of said arch and the perforation of said bar, and a loop or clip adapted to adjustably engage the vertical draft-bar and the clevis of the cultivator-beam, substantially as set forth.

In testimony that I claim the foregoing as my own I have hereto affixed my signature in presence of two witnesses.

EMERSON E. HATFIELD.

Witnesses:
  E. R. DURHAM,
  J. M. NEVILL.